(12) United States Patent
Gaber et al.

(10) Patent No.: US 10,705,940 B2
(45) Date of Patent: Jul. 7, 2020

(54) SYSTEM OPERATIONAL ANALYTICS USING NORMALIZED LIKELIHOOD SCORES

(71) Applicant: EMC IP Holding Company LLC, Hopkinton, MA (US)

(72) Inventors: Shiri Gaber, Beer Sheva (IL); Ohad Arnon, Beir Nir (IL)

(73) Assignee: EMC IP Holding Company LLC, Hopkinton, MA (US)

(*) Notice: Subject to any disclaimer, the term of this patent is extended or adjusted under 35 U.S.C. 154(b) by 114 days.

(21) Appl. No.: 16/145,536

(22) Filed: Sep. 28, 2018

(65) Prior Publication Data

US 2020/0104233 A1 Apr. 2, 2020

(51) Int. Cl.
*G06F 11/34* (2006.01)
*G06N 20/00* (2019.01)

(52) U.S. Cl.
CPC ...... *G06F 11/3452* (2013.01); *G06F 11/3419* (2013.01); *G06F 11/3476* (2013.01); *G06N 20/00* (2019.01); *G06F 2201/88* (2013.01)

(58) Field of Classification Search
CPC ............ G06F 11/3419; G06F 11/3452; G06F 11/3476; G06F 2201/88; G06N 20/00
USPC ...................................................... 714/26, 37
See application file for complete search history.

(56) References Cited

U.S. PATENT DOCUMENTS

| | | | |
|---|---|---|---|
| 8,688,620 B2* | 4/2014 | Viswanathan | G06F 11/076 706/62 |
| 2018/0176241 A1* | 6/2018 | Manadhata | H04L 67/10 |

OTHER PUBLICATIONS

U.S. Appl. No. 14/980,479 entitled, "System Operational Analytics" filed Dec. 28, 2015.
U.S. Appl. No. 14/282,092 entitled, "System Operational Analytics" filed Sep. 30, 2016.
U.S. Appl. No. 16/038,370 entitled, "System Operational Analytics Using Additional Features for Health Score Computation" filed Jul. 18, 2018.

* cited by examiner

*Primary Examiner* — Joseph R Kudirka
(74) *Attorney, Agent, or Firm* — Ryan, Mason & Lewis, LLP

(57) ABSTRACT

Techniques are provided for system operational analytics using normalized likelihood scores. In one embodiment, an exemplary method comprises: obtaining data from data sources associated with a monitored system; applying at least one function to the log data to obtain a plurality of time-series counters for a plurality of distinct features within the data; processing the plurality of time-series counters using at least one machine learning model to obtain a plurality of log likelihood values representing a behavior of the monitored system over time; determining a z-score for each of the plurality of log likelihood values over a predefined short-term time window; monitoring a distribution of the z-scores for the plurality of log likelihood values over a predefined long-term time window to map the z-scores to percentile values; and mapping the percentile values to a health score for the monitored system based on predefined percentile ranges and/or a transformation function.

20 Claims, 7 Drawing Sheets

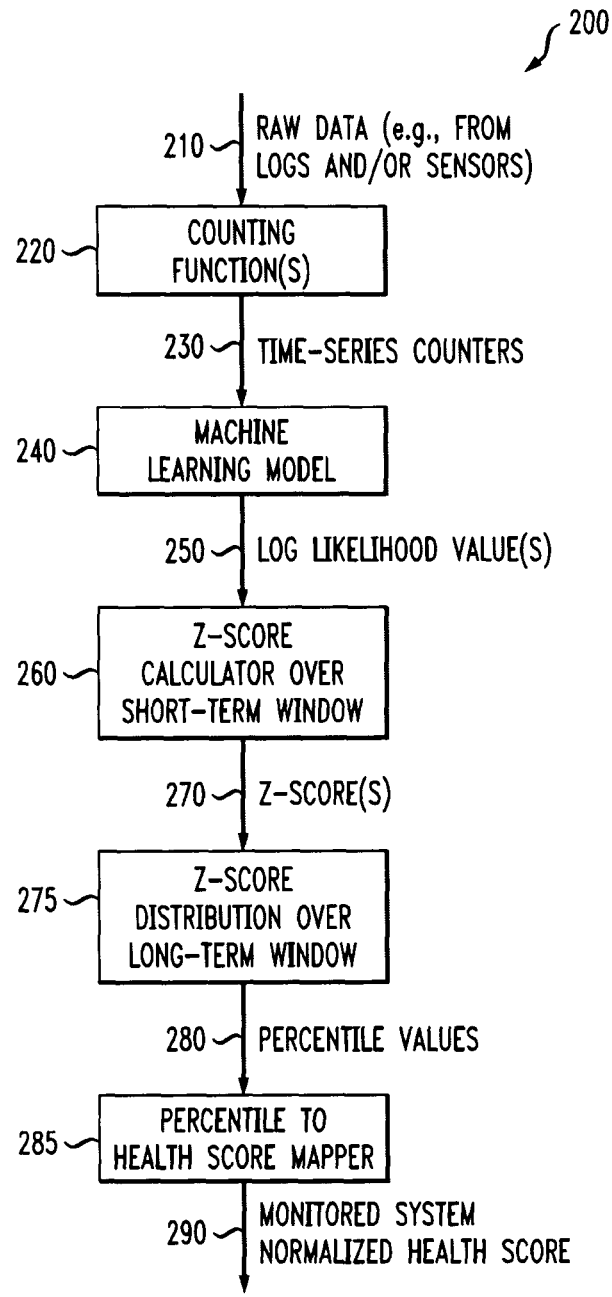

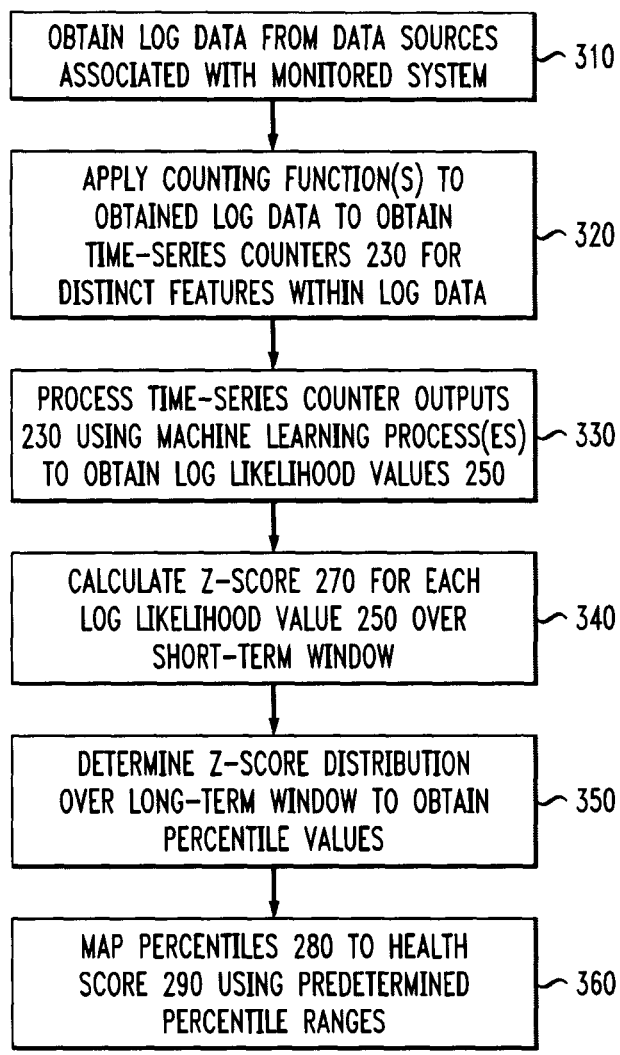

SYSTEM OPERATIONAL ANALYTICS USING NORMALIZED LIKELIHOOD SCORES

FIELD

The field relates generally to system monitoring techniques and, more particularly, to techniques for processing time-series data.

BACKGROUND

Information Technology (IT) systems are becoming increasingly distributed and are often comprised of multiple micro-services running in parallel. Thus, monitoring the performance of such IT systems has become increasingly challenging. Human-assisted machine learning (ML) solutions are being deployed to monitor and analyze the behavior of such IT systems and associated software applications.

Traditional ML solutions, however, typically provide naïve models, in the sense that they often take advantage of the data only in its raw form, often with sparse feature values and other data quality issues, potentially resulting in unnecessarily complicated ML models. In addition, the monitoring solution itself may become difficult to track and maintain.

A need therefore exists for improved techniques for monitoring the performance of IT systems and other monitored systems. A further need exists for improved monitoring techniques that provide actionable insights that enable monitoring personnel to take action with a reduced latency.

SUMMARY

Illustrative embodiments of the present disclosure provide techniques for system operational analytics using normalized likelihood scores. In one embodiment, an exemplary method comprises: obtaining data from one or more data sources associated with a monitored system; applying at least one function to the log data to obtain a plurality of time-series counters for a plurality of distinct features within the data; processing the plurality of time-series counters using at least one machine learning model to obtain a plurality of log likelihood values representing a behavior of the monitored system over time; determining a z-score for each of the plurality of log likelihood values over a predefined short-term time window; monitoring a distribution of the z-scores for the plurality of log likelihood values over a predefined long-term time window to map the s-scores to percentile values; and mapping the percentile values to a health score for the monitored system based on one or more of the predefined percentile ranges and a transformation function.

In some embodiments, the z-scores for the log likelihood values over the predefined short-term time window evaluate a deviation of a given log likelihood value from a learned normal behavior of the monitored system during the predefined short-term time window. The percentile values can be mapped to the health score for the monitored system by sorting the z-scores and selecting a percentage of the z-scores as corresponding to anomalous behavior based on the predefined percentile ranges.

Other illustrative embodiments include, without limitation, apparatus, systems, methods and computer program products comprising processor-readable storage media.

BRIEF DESCRIPTION OF THE DRAWINGS

FIG. 2 illustrates an exemplary performance monitoring system, according to at least one embodiment of the disclosure;

FIG. 3 is a flow chart illustrating an exemplary implementation of a performance monitoring process, according to one embodiment of the disclosure;

DETAILED DESCRIPTION

Figure 1:
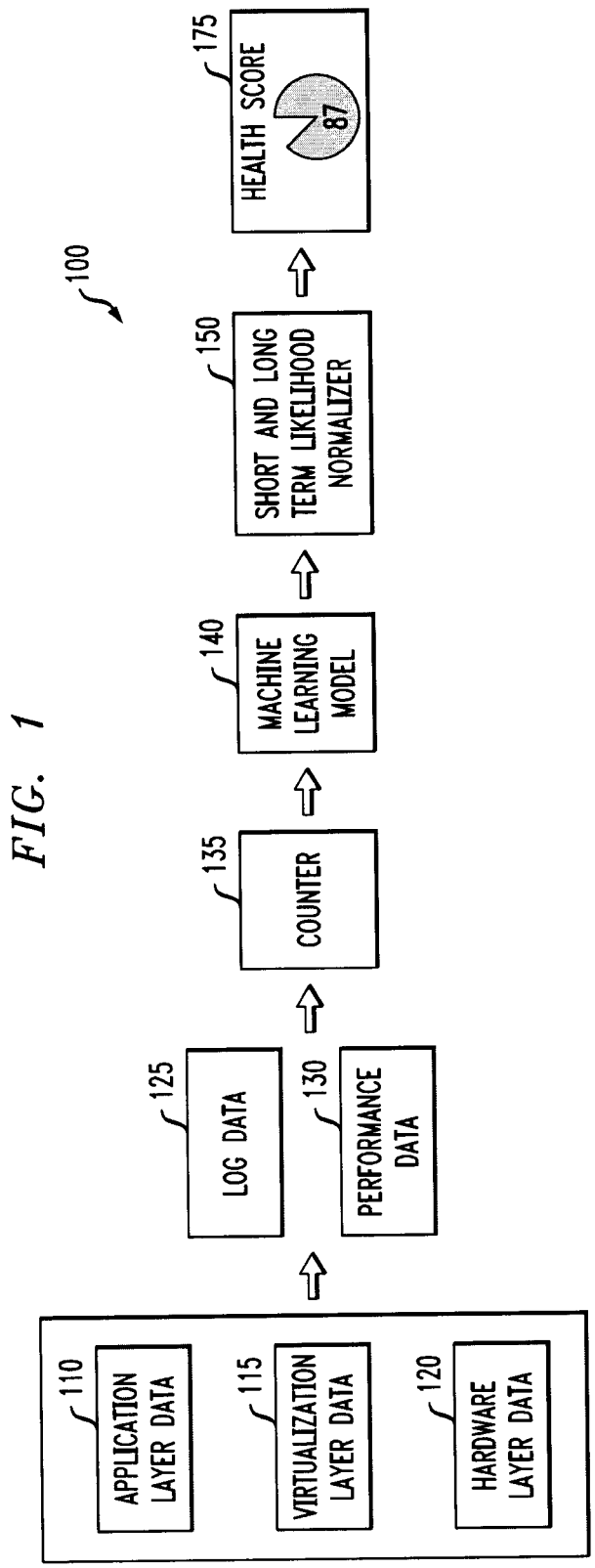
FIG. 1 illustrates an exemplary pipeline for a performance monitoring system, according to some embodiments.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for system operational analytics using normalized likelihood scores based on short-term and long-term normalization.

IT systems are becoming highly distributed and typically comprise multiple microservices and services running in parallel. More specifically, anomalous system behavior is harder to detect as it may only manifest in the joint behavior of multiple features on different layers. Thus, it is becoming increasingly challenging to monitor system performance in such IT systems. Human assisted, machine learning solutions are becoming a common practice for monitoring and analyzing the behavior of such systems and applications. The output of such ML techniques is a log likelihood value, providing a measure of the probability to observe the current data point given the learned past behavior of the system. Due to the high dimensionality of such systems, however, this log likelihood measure is extremely small and unbounded (e.g., varies between 0 and negative infinity) (representing the (log) probability of a specific behavior to occur out of a probability distribution, typically with a very large number of dimensions). Since the log likelihood measures are unbounded and unnormalized, it is difficult, if not impossible, to interpret the raw likelihood in real time. In other words, the same likelihood value can be interpreted differently from time to time and from one person to another. This may result in attributing two opposite meanings to the same output, which in real time leads to false alarms and to missing true alarms (which is even more problematic). Thus, a straightforward indication from the output score to the system state is not provided, and can lead to different interpretations from time to time and from one person to another.

In one or more embodiments, techniques for system operational analytics are provided using normalized likelihood scores based on short-term and long-term normalization that map the log likelihood values to a normalized (and bounded) 0-100 health score, for example, in real-time. The disclosed approach creates a correlation between the health score observed by the system administrator and the system state. In this manner, a critical state can be consistently and reliably interpreted as such, and enables monitoring personnel to take action with a reduced latency.

One approach for normalizing a sequence of scores is to compare the current value to the maximum and minimum value observed in a specific time window. Since the data is dynamic and the range changes in real time, these ranges need to be learned dynamically. On the other hand, referring only to the short-term statistics of the system at hand may lead to falsely identifying anomalies that do not necessarily exist in every time period. Thus, one or more aspects of the disclosure recognize that a combination of short-term and long-term normalization can be used to infer a one-to-one relationship between a likelihood value and a system state that is representative of the system state in any given time and can lead to an immediate action.

For most time-stamps, the log likelihood values are close to 0 indicating a normal state with a moderate probability. Typically, larger negative log likelihood values indicate abnormal states whose probability is very small and can theoretically reach negative infinity. It is challenging to place an upper and lower limit for these scores as they change dynamically.

One statistical approach for normalizing unbounded scores is to use percentiles. In other words, likelihood scores are sorted by their severity and the bottom predefined number (bottom N) or percentage (x %) are considered as anomalies. This approach may be problematic, since in many cases the identified anomalies are an artifact of the normalization process itself and do not represent a true anomaly in the data. For example, if the likelihood is entirely stable during the time window, x % data points will still be identified as anomalies using this approach. Thus, directly mapping percentiles of raw data to health scores can lead to numerous false alerts; which may lead to a severe financial loss for an organization.

To establish the "ground truth" of the system behavior and reliably identify anomalies, one needs to "learn" the likelihood baseline over a long period of time. In this manner, one can identify an extreme behavior that occurs rarely and generate an alert. The problem with this approach evolves from the timely nature of abnormal behavior: As the system behavior changes over time, a likelihood value that was considered abnormal at a specific time may be acceptable at a different time and vice versa. More specifically, it may be beneficial to alert on a relatively small deviation from the mean following an extremely stable period but not during an extremely noisy one. Thus, learning the "ground truth" of a system from long periods of raw-likelihood observations may lead to missing anomalies in the health of the system. In other words, changes in the system dynamics (e.g., a change in the baseline of the log likelihood) may lead to missing anomalies.

Thus, to automatically identify anomalies in the data in real time, the disclosed system operational analytics techniques employ a hybrid approach to dynamically learn the long-term and short-term statistics of the likelihood scores. In some embodiments, the time constants for the training, as other parameters of the model, are configurable through a configuration file that can be modified by a user. In further variations, the short and long-term time constants and the other parameters of the model are specified based on one or more policies, default values and/or rules. For example, a relevant time window to learn the long-term statistics of the likelihood can be one year and the short-term time window for transforming the likelihood to a z-score can be one hour. The long-term time window can also be defined to be unlimited (e.g., the more that data is accumulated, the more that the statistics approach the "ground truth" for the system behavior).

FIG. 1 illustrates an exemplary pipeline 100 for an exemplary performance monitoring system, according to some embodiments. As shown in FIG. 1, the exemplary pipeline 100 receives one or more of application layer data 110, virtualization layer data 115 and hardware layer data 120, for example, in the form of log data 125 and/or performance data 130. In some embodiments, the application layer data 110 comprises, for example, data from connection and security servers, composers, view agents, and/or event databases. The exemplary virtualization layer data 115 comprises data from vCenter servers, ESXi hosts, vSANs (virtual storage area networks), vCenter databases (e.g., historical events), and/or virtual machines. The exemplary hardware layer data 120 comprises data from, for example, physical servers/appliances, network/storage switches and/or storage arrays. The received log data 125 and/or performance data 130 is transformed into time-series data using a counter 135. In some embodiments, the counter 135 applies at least one counting function to the log data 125 and/or performance data 130, to obtain time-series counters for a plurality of distinct features within the log data 125 and/or performance data 130.

In one or more embodiments, the time-series counters generated by the counter 135 are applied as an input to a machine learning model 140 that learns a multidimensional distribution describing the normal behavior of the monitored system. The machine learning model 140 generates a log-likelihood value that is processed/normalized using a short and long-term likelihood normalizer 150, according to one or more embodiments of the disclosure discussed further below in conjunction with FIGS. 2, 3 and 5, to generate a single health score 175 (for example, in a bounded range from 0-100).

FIG. 2 illustrates an exemplary performance monitoring system 200, according to at least one embodiment of the disclosure. As shown in FIG. 2, the exemplary performance monitoring system 200 applies raw collected data 210, such as log data from one or more logs and/or sensors, to one or more counting functions 220 that generate one or more of time-series counters 230 for a plurality of distinct features within the log data. The time-series counters generated by the counting functions 220 are processed using one or more machine learning models 240 to generate a plurality of log likelihood values 250 representing a behavior of the monitored system over time.

As shown in FIG. 2, the log likelihood values 250 are processed by a z-score calculator 260 over a short-term window. In some embodiments, z-score calculator 260 determines a z-score 270 for each of the plurality of log likelihood values over the short-term time window. To identify anomalies over long time periods, it is beneficial to take into account a statistical measure of deviation from the "mean" behavior rather than looking at the raw likelihood values. In this manner, the value that is eventually mapped to a 0-100 normalized score reflects a digression from normal behavior. This measure is calculated by the z-score calculator 260 over the short-term window to represent the level of disparity between the current value and its recent predecessors (e.g., within the short-term window). The statistical measure used can be different variations of "z-score" normalization. In one representation, a z-score is the distance of the observation from the mean divided by the standard deviation (e.g., when the likelihood distribution resembles a normal distribution).

For example, in statistics, the z-score (also referred to as a standard score), is the signed number of standard deviations (σ) by which the value of an observation or data point (x) is above the mean value (μ) of what is being observed or measured. The z-score computation may be expressed as follows, in some embodiments:

$$z = \frac{x - \mu}{\sigma},$$

where μ is the mean of the population and a is the standard deviation of the population.

More elaborate variations can optionally be applied to bi-modal, non-symmetric and other distinctive distributions. These include the Median Absolute Deviation (MAD) and the double MAD measure that use the distance from median instead of the distance from the mean. Transforming the data into a normalized "z-score" in this manner ensures that even if the raw likelihood values change over time, the deviations from recent normal behavior will be considered for making the decision of an anomaly. In other words, deviations from recent normal behavior will be manifested as a low health score which will lead system administrators to apply appropriate actions.

Thus, in a further variation, a MAD measure may be used to measure the z-score. Generally, the median absolute deviation is a robust measure of the variability of a univariate sample of quantitative data. The median absolute deviation computation may be expressed as follows, in some embodiments:

$$\text{MAD} = \text{media}(|X_i - \tilde{X}|),$$

where:

$$\tilde{X} = \text{median}(X).$$

As shown in FIG. 2, a distribution of the z-scores 270 is obtained over a long-term window by module 275. Generally, the distribution of the z-scores 270 for the log likelihood values are monitored over the long-term time window to identify percentile values 280. A percentile to health score mapper 285 maps the percentile values 280 for the log likelihood values to a normalized health score 290 for the monitored system, based on the percentile values 280, as discussed further below in conjunction with FIGS. 5 and 6. In some embodiments, the percentile values 280 are mapped to corresponding health scores, for example, based on a specified configuration, policies, default values and/or rules.

FIG. 3 is a flow chart illustrating an exemplary implementation of a performance monitoring process 300, according to one embodiment of the disclosure. As shown in FIG. 3, the exemplary performance monitoring process 300 initially obtains log data from one or more data sources associated with a monitored system during step 310. Thereafter, one or more counting function(s) are applied during step 320 to the obtained log data in order to obtain one or more corresponding time-series counters 230 for distinct features within the log data.

In one or more embodiments, the exemplary performance monitoring process 300 processes the time-series counter outputs 230 during step 330 using one or more machine learning process(es) to obtain the log likelihood values 250.

During step 340, the exemplary performance monitoring process 300 calculate a z-score 270 for each log likelihood value 250 during step 340 over the short-term window. The distribution of the z-scores 270 are monitored during step 350 over the long-term window to obtain the percentile values 280 (as discussed further below in conjunction with FIGS. 5 and 6).

Finally, the exemplary performance monitoring process 300 maps the percentiles 280 to a corresponding normalized health score 290 during step 360 using predetermined percentile ranges and one or more transformation functions (e.g., a linear or exponential function). To automatically map z-scores to the normalized health scores (e.g., between 0-100) during step 360, the system behavior needs to be learned over long periods of time. The longer the training period, the closer the distribution of z-scores 270 resembles the "ground-truth" of the system behavior (which allows to make a one-to-one implication from the z-score 270 to a normalized health score 290 that represents the system state).

In some embodiments, the long-term behavior is learned by means of percentile values 280 that are applied on the z-scores 270 extracted from the short-term behavior in consecutive time windows (e.g., the percentile values 280 are preconfigured and can be updated with time). The z-score bottom percentiles, which are considered as anomalies, can also be defined through the configuration file (or through policies, default values and/or rules in other variations) and alerted on. For example, the user can configure the system to map a z-score 270 that the system has learned to be at the bottom 5% over one year of training, to a 0-100 score. This low normalized health score 290 will trigger an anomaly alert that system administrators can act against.

Thus, in at least one embodiment, the z-score is calculated as the deviation of the log-likelihood from the mean over the predefined short time period. The z-scores are collected over the predefined long time period, sorted and transformed into their percentile values. The percentile values are then transformed into normalized health scores based on predefined percentile ranges and one or more transformation functions (linear/exponential). An additional trigger can optionally be set to automatically alert on a health score lower than a predefined value representing abnormal behavior.

Figure 4A:
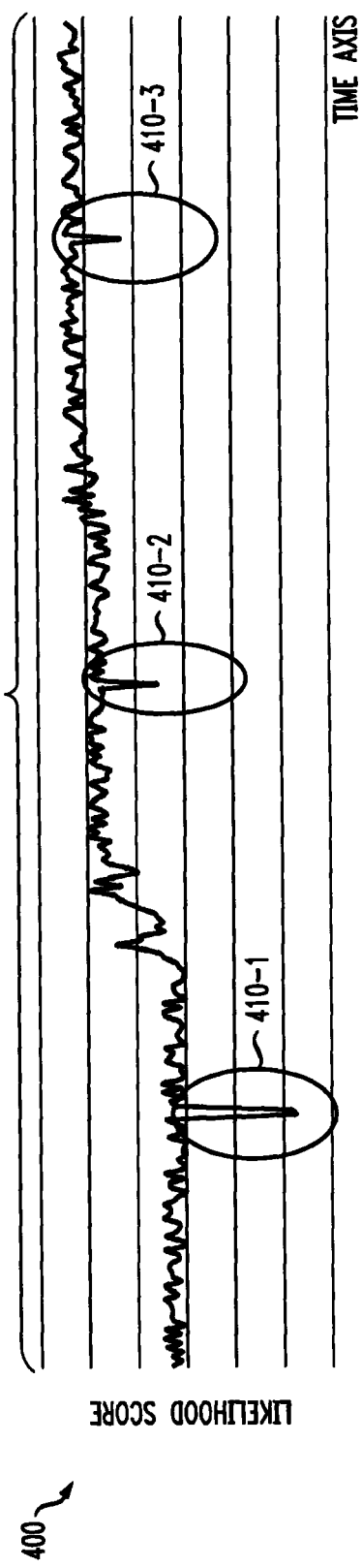
FIGS. 4A and 4B illustrate exemplary performance evaluations using a long-term normalization and a short-term normalization, respectively.

FIG. 4A illustrates an exemplary performance evaluation 400 using a long-term normalization 425. As shown in FIG. 4A, the exemplary performance evaluation 400 evaluates the likelihood scores 250 as a function of time. As noted above, changes in the system dynamics may lead to missing anomalies (false anomalies). FIG. 4A illustrates a change in the baseline of the log likelihood values. While it would be beneficial to alert on all three anomalies 410-1 through 410-3, tracking the absolute values of log likelihood will lead to treating the earlier values as normal behavior, as their absolute value levels with the new learned baseline.

Figure 4B:
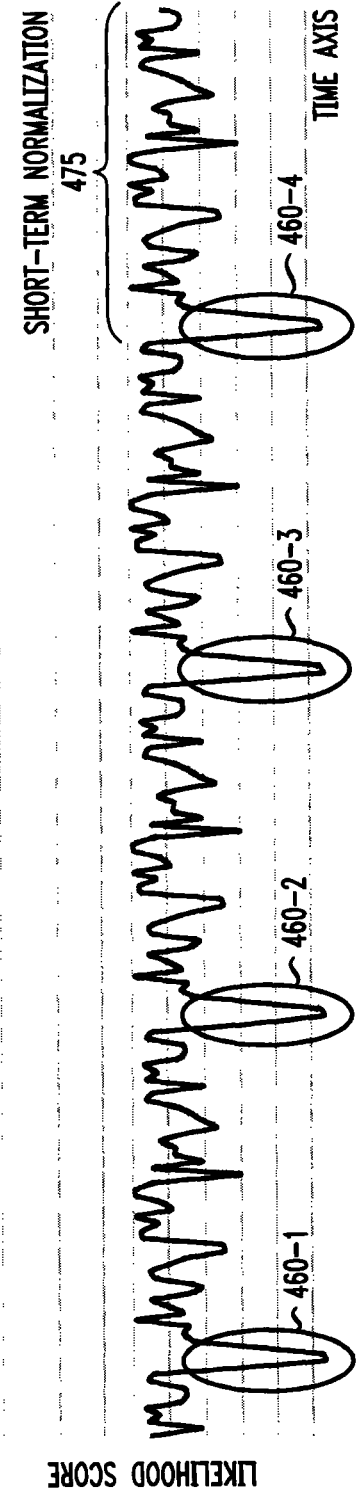

FIG. 4B illustrates an exemplary performance evaluation 450 using a short-term normalization 475. Deviations in a short-term time window (e.g., local outliers) may actually represent valid behavior when considered in a longer time window, corresponding to false positives, improperly alerting valid behavior. FIG. 4B illustrates four anomalies 460-1 through 460-4, corresponding to false positives.

Thus, in one or more embodiments, techniques for system operational analytics are provided using normalized likelihood scores based on short-term and long-term normalization that map the log likelihood values to a normalized (and bounded) 0-100 health score, for example, in real-time. The disclosed approach creates a reliable correlation between the health score observed by the system administrator and the system state. In this manner, a critical state can be consistently and reliably interpreted as such, and enables monitoring personnel to take action with a reduced latency.

Figure 5:
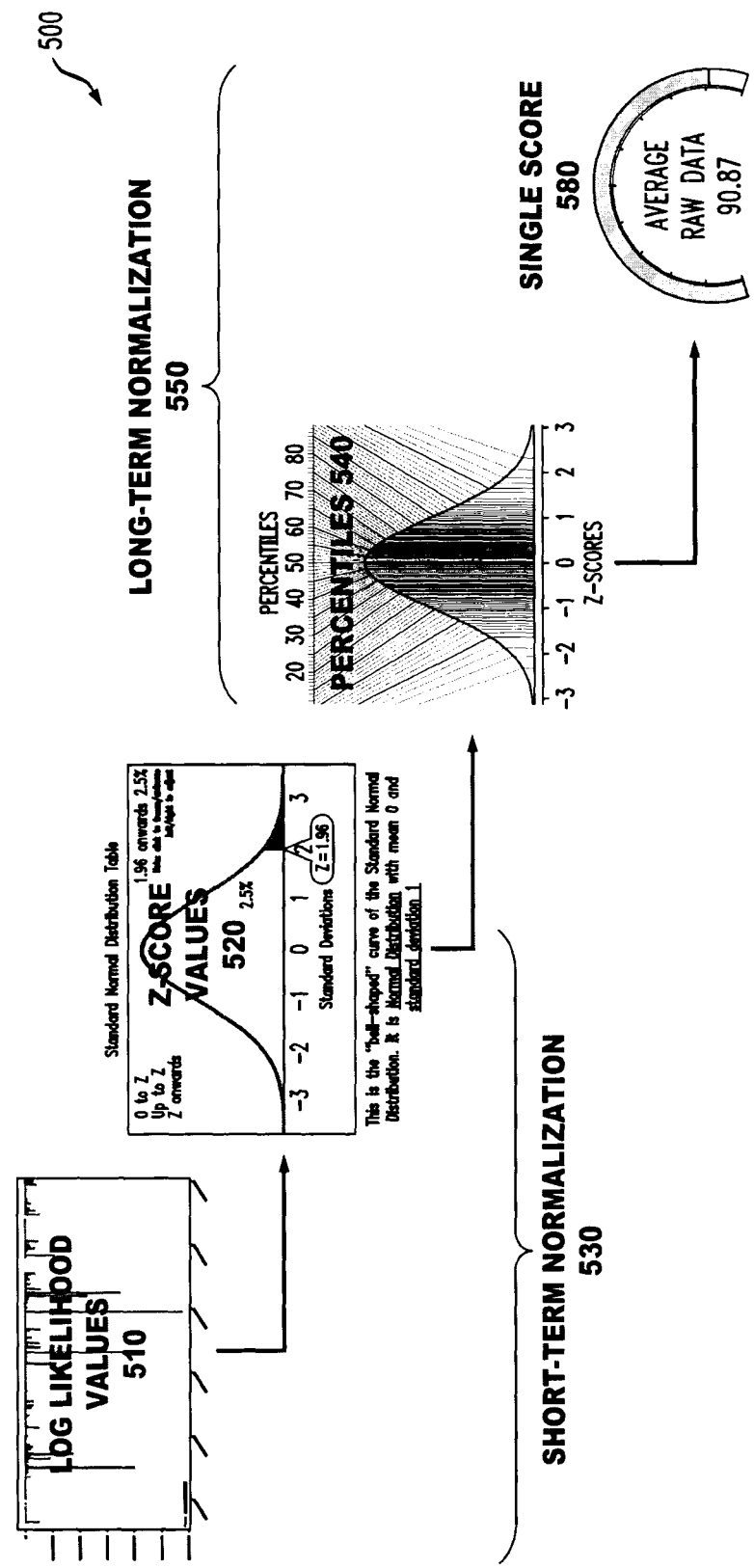
FIG. 5 illustrates an exemplary performance evaluation using short-term and long-term normalization to obtain a normalized health score, according to at least one embodiment of the disclosure.

FIG. 5 illustrates an exemplary performance evaluation 500 using short-term and long-term normalization 530, 550, respectively, to obtain a normalized health score 580, according to at least one embodiment of the disclosure. The exemplary embodiment of FIG. 5 performs the performance evaluation 500 in two stages.

During a first stage, a short-term normalization 530 is performed by transforming the raw log likelihood values 510 into z-scores 520 that manifest the short-term statistics of the likelihood measure. As noted above, a representative short-term window may be one hour or one day, while a representative long-term window may be one month or one year.

During a second stage, a long-term normalization 550 is performed by mapping the z-scores 520 to a normalized health score between 0-100 using predefined percentile ranges 540 (discussed further below in conjunction with FIG. 6), based on the long-term behavior of the system that manifests the "ground truth" of the system behavior. For example, the bottom 5% of z-scores 520 may be mapped to a health score 580 of 0-100, which can be configured to trigger an alarm. Generally, as noted above, the percentile values 540 of the z-scores 520 are calculated over the long-term window during the long-term normalization 550.

In this manner, system administrators can acquire fast, data-based and actionable insights, and thereby prevent the monitored system from reaching a critical state and compromising mission-critical services.

Figure 6:
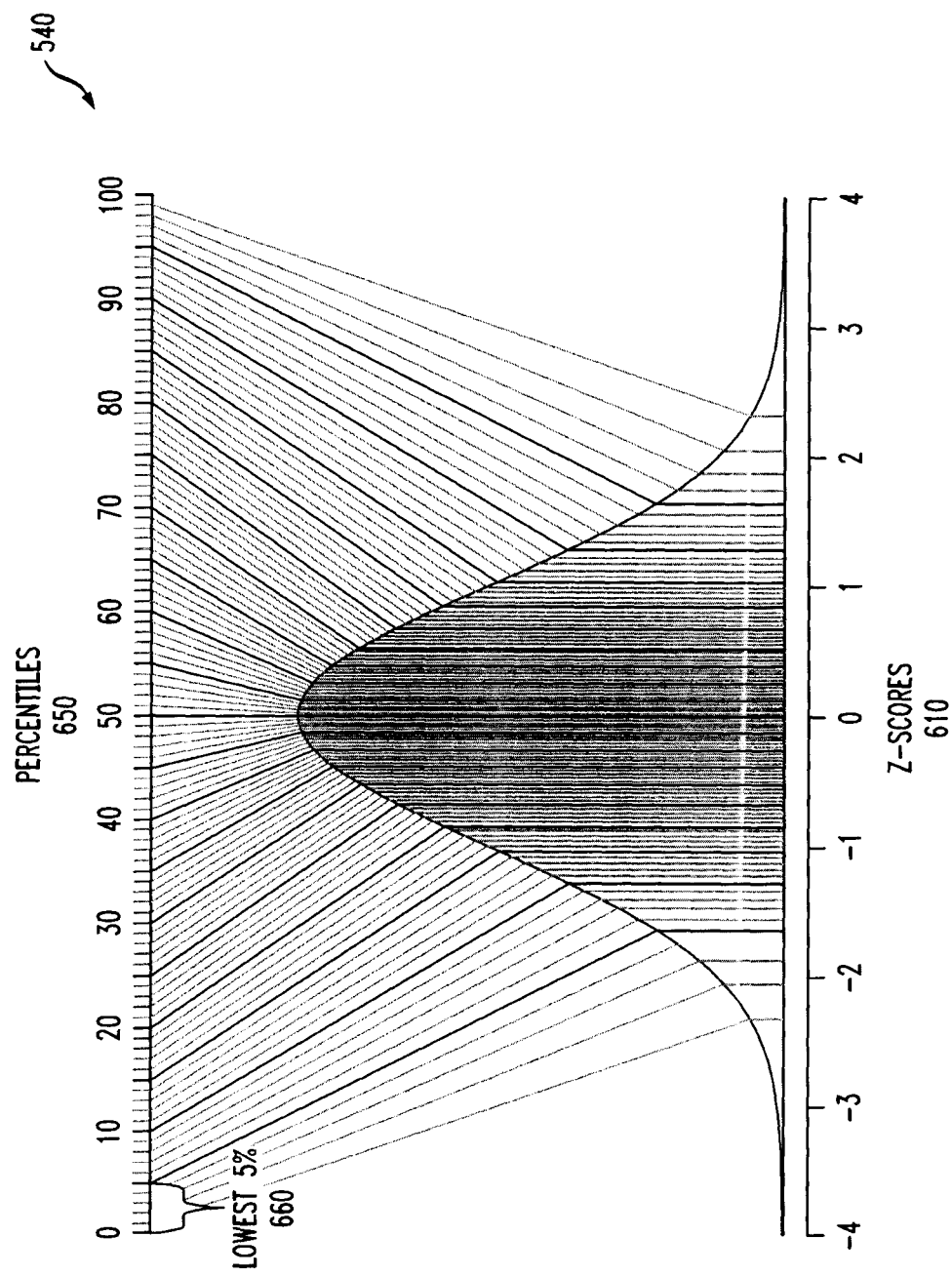
FIG. 6 illustrates the long-term normalization of FIG. 5 in further detail, according to an embodiment of the disclosure.

FIG. 6 illustrates the learned percentile values 540 of the long-term normalization 550 of FIG. 5 in further detail, according to an embodiment of the disclosure. As shown in FIG. 6, the distribution of z-scores over the long-term window can be used to learn bands of percentile ranges 650 in a range of 0-100%. Assuming that a user has configured the system to generate an alert for the lower 5% of z-scores 610, corresponding to a percentile range 660, all z-scores 610 below a value of approximately −1.7 will trigger an alert.

Example

One exemplary implementation of an IT Operational Analytics monitoring system monitors mission critical applications and integrates multiple Key Performance Indicators (KPIs) extracted from the application log data into one normalized health score adhering to the system state. In the exemplary solution, each KPI is a time-series of values that are later handled as "features" used as input to a machine learning model that learns the system normal behavior as a whole. The output of this machine learning algorithm is log likelihood values which are unbounded and problematic to interpret, as discussed above.

To provide a meaningful health-score, this log likelihood output is normalized to a number between 0-100 using the disclosed likelihood score normalization techniques. The disclosed solution enables faster detection of non-trivial abnormal behavior of the system (allowing the administrators in charge of monitoring the system to take immediate action when the health score drops below a certain threshold).

In one implementation, an object oriented solution for the normalization is employed. There is a separation between the data objects and the normalization algorithm object (e.g., a functional object implementing all the normalization functions, pointing to separate data objects in charge of storing and managing all health score-related data). The normalization algorithm object receives the log likelihood value 250 from the machine learning model object (corresponding to element 240 in FIG. 2) and applies the following functions:

(i) add_predicted_jog_likelihood( )—append the instantaneous log likelihood value 250 to a log likelihood data object;

(ii) calculate_z_score( )—transform the log likelihood value 250 to a z-score 270 based on the short-term statistics (e.g., z-scores collected from the previous day); and (iii) calculate health score( )—return a normalized health score 290 from 0-100 based on the long-term statistics of the z-score 270 (e.g., z-scores collected from the previous year).

The generated normalized health score 290 is a single number (e.g., in a range 0-100) that describes the system health at the current time stamp. The generated normalized health score 290 is optionally consumed via smart dashboards, to which the system administrators can easily refer to. Thus, the exemplary solution outputs, including the instantaneous health score, can optionally be visualized with smart dashboards using Kibana or another visualization tool.

In some embodiments, the disclosed system operational analytics techniques use likelihood score normalization techniques to generate a single interpretable health score for the monitored system.

Among other benefits, the disclosed performance monitoring techniques provide better insight into system health and provide compact models that are more accurate and easier to maintain. As noted above, the exemplary likelihood score normalization techniques improve the interpretability of the generated system health score.

One or more embodiments of the disclosure provide improved methods, apparatus and computer program products for system operational analytics using likelihood score normalization techniques for computing a health score. The foregoing applications and associated embodiments should be considered as illustrative only, and numerous other embodiments can be configured using the techniques disclosed herein, in a wide variety of different applications.

It should also be understood that the disclosed performance monitoring techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed performance monitoring techniques may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based performance monitoring engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based performance monitoring platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
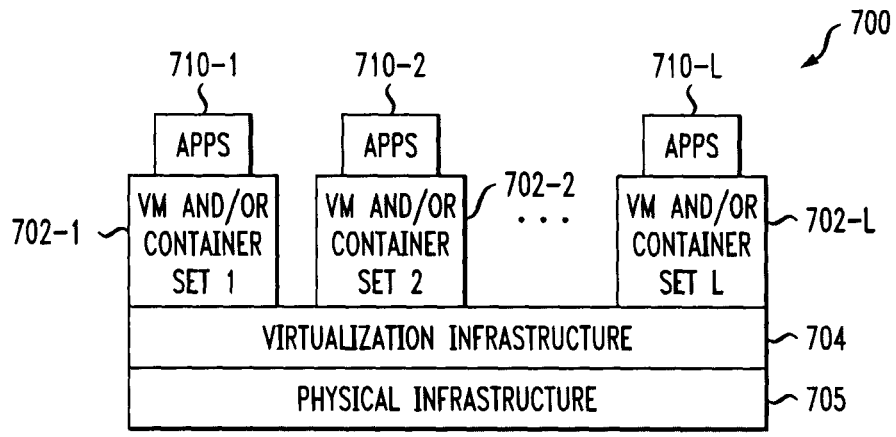
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of a performance monitoring system. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide performance monitoring functionality of the type described above for one or more processes running on a given one of the VMs. For example, each of the VMs can implement performance monitoring control logic and associated performance monitoring functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide performance monitoring functionality of the type described above for one or more processes running on different ones of the containers. For example, a container host device supporting multiple containers of one or more container sets can implement one or more instances of performance monitoring control logic and associated performance monitoring functions.

As is apparent from the above, one or more of the processing modules or other components of a performance monitoring system may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
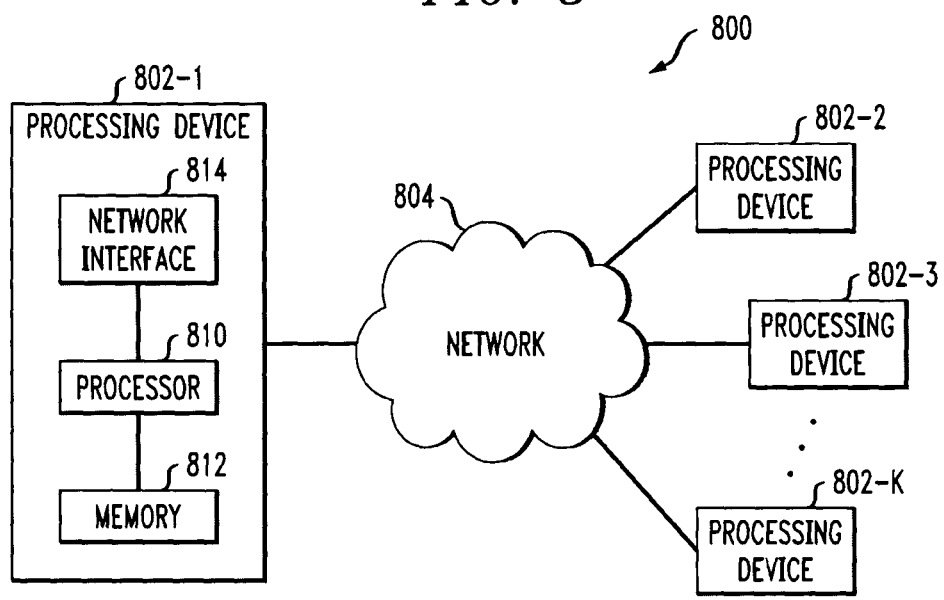
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining data from one or more data sources associated with a monitored system;
applying at least one function to the data to obtain a plurality of time-series counters for a plurality of distinct features within the data;
processing, using at least one processing device, the plurality of time-series counters using at least one machine learning model to obtain a plurality of log likelihood values representing a behavior of the monitored system over time;
determining, using the at least one processing device, a z-score for each of the plurality of log likelihood values over a predefined short-term time window;
monitoring, using the at least one processing device, a distribution of the z-scores for the plurality of log likelihood values over a predefined long-term time window to map the z-scores to percentile values; and
mapping, using the at least one processing device, the percentile values to a health score for the monitored system based on one or more of predefined percentile ranges and at least one transformation function.

2. The method of claim 1, wherein the plurality of log likelihood values represents a probability of a specific behavior to occur out of a probability distribution behavior of the monitored system.

3. The method of claim 1, wherein the z-scores for the plurality of log likelihood values over the predefined short-term time window determine a distance of a given log likelihood value from a mean of the plurality of log likelihood values divided by a standard deviation of the plurality of log likelihood values.

4. The method of claim 1, wherein the z-scores for the plurality of log likelihood values over the predefined short-term time window determine a distance of a given log likelihood value from a median of the plurality of log likelihood values.

5. The method of claim 1, wherein the z-scores for the plurality of log likelihood values over the predefined short-term time window evaluate a deviation of a given log likelihood value from a learned normal behavior of the monitored system during the predefined short-term time window.

6. The method of claim 1, wherein the step of mapping the percentile values to the health score for the monitored system further comprises sorting the z-scores for the plurality of log likelihood values and selecting a percentage of the z-scores as corresponding to anomalous behavior based on the predefined percentile ranges.

7. The method of claim 1, wherein one or more of the predefined short-term time window, the predefined long-term time window, and the predefined percentile ranges comprise one or more of a configured value, a policy-based value, and a default value.

8. A system, comprising:
a memory; and
at least one processing device, coupled to the memory, operative to implement the following steps:
obtaining data from one or more data sources associated with a monitored system;
applying at least one function to the data to obtain a plurality of time-series counters for a plurality of distinct features within the data;
processing the plurality of time-series counters using at least one machine learning model to obtain a plurality of log likelihood values representing a behavior of the monitored system over time;
determining a z-score for each of the plurality of log likelihood values over a predefined short-term time window;
monitoring a distribution of the z-scores for the plurality of log likelihood values over a predefined long-term time window to map the z-scores to percentile values; and
mapping the percentile values to a health score for the monitored system based on one or more of predefined percentile ranges and at least one transformation function.

9. The system of claim 8, wherein the plurality of log likelihood values represents a probability of a specific behavior to occur out of a probability distribution behavior of the monitored system.

10. The system of claim 8, wherein the z-scores for the plurality of log likelihood values over the predefined short-term time window determine a distance of a given log likelihood value from a mean of the plurality of log likelihood values divided by a standard deviation of the plurality of log likelihood values.

11. The system of claim 8, wherein the z-scores for the plurality of log likelihood values over the predefined short-term time window determine a distance of a given log likelihood value from a median of the plurality of log likelihood values.

12. The system of claim 8, wherein the z-scores for the plurality of log likelihood values over the predefined short-term time window evaluate a deviation of a given log likelihood value from a learned normal behavior of the monitored system during the predefined short-term time window.

13. The system of claim 8, wherein the step of mapping the percentile values to the health score for the monitored system further comprises sorting the z-scores for the plurality of log likelihood values and selecting a percentage of the z-scores as corresponding to anomalous behavior based on the predefined percentile ranges.

14. The system of claim 8, wherein one or more of the predefined short-term time window, the predefined long-term time window, and the predefined percentile ranges comprise one or more of a configured value, a policy-based value, and a default value.

15. A computer program product, comprising a non-transitory machine-readable storage medium having encoded therein executable code of one or more software programs, wherein the one or more software programs when executed by at least one processing device perform the following steps:
obtaining data from one or more data sources associated with a monitored system;
applying at least one function to the data to obtain a plurality of time-series counters for a plurality of distinct features within the data;
processing the plurality of time-series counters using at least one machine learning model to obtain a plurality of log likelihood values representing a behavior of the monitored system over time;
determining a z-score for each of the plurality of log likelihood values over a predefined short-term time window;
monitoring a distribution of the z-scores for the plurality of log likelihood values over a predefined long-term time window to map the z-scores to percentile values; and
mapping the percentile values to a health score for the monitored system based on one or more of predefined percentile ranges and at least one transformation function.

16. The computer program product of claim 15, wherein the plurality of log likelihood values represents a probability of a specific behavior to occur out of a probability distribution behavior of the monitored system.

17. The computer program product of claim 15, wherein the z-scores for the plurality of log likelihood values over the predefined short-term time window determine a distance of a given log likelihood value from a mean of the plurality of log likelihood values divided by a standard deviation of the plurality of log likelihood values.

18. The computer program product of claim 15, wherein the z-scores for the plurality of log likelihood values over the predefined short-term time window determine a distance of a given log likelihood value from a median of the plurality of log likelihood values.

19. The computer program product of claim 15, wherein the z-scores for the plurality of log likelihood values over the predefined short-term time window evaluate a deviation of a given log likelihood value from a learned normal behavior of the monitored system during the predefined short-term time window.

20. The computer program product of claim 15, wherein the step of mapping the percentile values to the health score for the monitored system further comprises sorting the z-scores for the plurality of log likelihood values and selecting a percentage of the z-scores as corresponding to anomalous behavior based on the predefined percentile ranges.

* * * * *